United States Patent [19]
Hamilton

[11] 3,911,068
[45] Oct. 7, 1975

[54] POOL CHLORINATION DIFFUSER

[76] Inventor: Jock Hamilton, 21322 Pacific Coast Highway, Malibu, Calif. 90265

[22] Filed: July 2, 1973

[21] Appl. No.: 375,437

[52] U.S. Cl............. 261/121 R; 210/169; 261/122; 261/124; 261/DIG. 70
[51] Int. Cl.² .......................................... B01F 3/04
[58] Field of Search............. 261/122, 124, DIG. 70, 261/121 R; 210/169; 264/127

[56] References Cited
UNITED STATES PATENTS

| | | | |
|---|---|---|---|
| 2,595,965 | 5/1952 | Ludwick | 210/169 X |
| 3,432,154 | 3/1969 | Daxjes | 261/124 X |
| 3,520,416 | 7/1970 | Keedwell | 261/122 X |
| 3,650,405 | 3/1972 | Morrison | 210/169 X |
| 3,785,629 | 1/1974 | McKinney | 261/122 |

OTHER PUBLICATIONS

U.S. Trademark "Gore-Tex;" W. L. Gore and Associates, Inc.; 10–10–1972, No. 944,457.
U.S. Trademark No. 951,095; "Gore-Tex;" W. L. Gore and Associates, Inc.; 1-23-1973.

*Primary Examiner*—Frank W. Lutter
*Assistant Examiner*—William Cuchlinski, Jr.
*Attorney, Agent, or Firm*—William H. Pavitt, Jr.

[57] ABSTRACT

A chlorine diffuser for direct chlorination of swimming pool water with gaseous chlorine which includes a manifold and a plurality of porous plastic diffuser elements connected to the manifold. The diffuser elements are connected to the manifold for pressurization of the elements with gaseous chlorine from either of their ends and are formed of a plastic material which is inert to chlorine with the diffuser elements and may have a porosity of about 5 to about 95 percent. The diffuser elements have an outer surface which is water wettable but is not penetrated by water with a differential internal chlorine pressure of about 5 pounds per square inch. The diffuser elements have pores which range in size up to about 6 microns and the diffuser elements also have a stretchability to provide at least partial self cleaning to periodically cleanse the pores of the elements of contaminants found in liquid chlorine. Preferably, the diffuser elements are constructed of polytetrafluoroethylene.

14 Claims, 5 Drawing Figures

POOL CHLORINATION DIFFUSER

BACKGROUND OF THE INVENTION

To prevent the growth of fungi and bacterial organisms, it is common practice to add chlorine to the water of a swimming pool. Generally, the chlorine is added in the form of a salt which forms chlorine in situ on solution of the salt in the swimming pool water. While having disadvantages, chlorine-containing salts have been used as a chlorinating agent because of the difficulties involved in chlorinating swimming pool water directly using gaseous chlorine as the chlorinating agent.

A major disadvantage in the use of a salt in chlorinating a swimming pool is the cost of the chlorine-containing salt. Liquid chlorine is cheaper per unit weight of chlorine than a solid form of chlorine such as sodium hypochlorite. Thus, from a cost standpoint, it would be desirable to utilize gaseous chlorine for direct chlorination of swimming pool water instead of using a chlorine-containing salt.

A further disadvantage in the use of solid forms of chlorine is the time required for chlorination. Frequently, the pool owner may contract for the servicing of the swimming pool by a pool-servicing contractor who cleans and services the pool at regular intervals, such as once or twice a week. During servicing, the contractor may clean the pool walls, remove any debris, such as leaves, from the swimming pool, and also condition the swimming pool water to maintain its chlorine content and pH within prescribed limits. A pool contractor will generally service a number of pools during a single working day. Thus, the contractor will find it advantageous to service each pool as quickly as possible so that a maximum number of pools may be serviced in a single day.

The elapsed time which may be required for solution of a solid form of chlorine in the swimming pool water may be disruptive to the time scheduling for pool services by a pool service contractor. After addition of a solid form of chlorine to the water of a swimming pool, the contractor may want to check the pool water after the chlorine has been formed in situ and the chlorine content within the pool has equalized. Since these phenomena are time dependent, this would require that the contractor remain at the site of the pool for a given time or return later to test the pool water after chlorination.

Chlorine gas has been used for direct chlorination of swimming pool water but its use has not generally been successful due to the fact that the gaseous chlorine is not taken up by the pool water at a sufficiently rapid rate. In chlorinating a swimming pool directly with gaseous chlorine, the time required for the uptake of chlorine by the swimming pool water is directly related to the contact area between the swimming pool water and the gaseous chlorine which is being added. Thus, it would be desirable to have some means to increase the contact area between the gaseous chlorine and swimming pool water such that the chlorine could be much more rapidly taken up by the swimming pool water.

SUMMARY OF THE INVENTION

In providing a solution to the aforementioned problems, I have provided a chlorine diffuser for direct chlorination of swimming pool water with gaseous chlorine in which the contact area between the added chlorine gas and the swimming pool water is greatly increased. This provides a much more rapid uptake of the gaseous chlorine by the swimming pool water and, thus, makes the direct chlorination of a swimming pool with chlorine gas much more efficient than it has been heretofore.

The chlorine diffuser of the invention includes a manifold and a plurality of porous plastic diffuser elements connected to the manifold for pressurization of the elements with gaseous chlorine from each of their ends. The diffuser elements are made of a porous plastic material which is inert to chlorine and the diffuser elements may have, for example, a porosity of about 5 to about 95 percent. The outer surfaces of the diffuser elements are water wettable such that chlorine gas does not collect to any great extent on the surfaces of the elements. However, the elements are not penetrated by water at a differential internal chlorine pressure, i.e., the difference between the internal pressure within the diffuser elements and the external pressure of water against the elements, of about 5 pounds per square inch.

The microscopic pores in the diffuser elements may range in size up to about 6 microns. Thus, the gaseous chlorine admitted to the swimming pool water through the elements is in the form of minute bubbles which greatly increases the contact area between the admitted chlorine gas and the swimming pool water. This provides a much more rapid uptake of the chlorine by the swimming pool water.

In addition, the diffuser elements have a resiliency or stretchability which provides at least partial self cleaning of the elements. During sustained use of the diffuser elements, contaminants found in liquid chlorine, such as finely divided iron oxide particles, will tend to obstruct the pores of the elements. When this occurs, there is a pressure build-up within the elements which causes them to stretch so that their pores are also stretched and slightly enlarged. The pores will then permit the passage of the contaminants with the pores then returning to their normal size for the further discharge of gaseous chlorine through the diffuser elements.

Preferably, the diffuser elements are constructed of porous polytetrafluoroethylene. Porous polytetrafluoroethylene tubes are available as commerical products sold under the trademark "GORE TEX" and are manufactured by W. L. Gore & Associates, Inc., 555 Paper Mill Road, Newark, Del., 19711.

The diffuser elements of the chlorine diffuser may be in the form of cylindrical tubes having an inside diameter of about ¼ to about ⅜ of an inch and preferably, the diffuser elements are relatively short in length, such as about 4 to about 16 inches.

In connecting the diffuser elements to the manifold, the manifold may include a pair of substantially parallel side headers and a pair of substantially parallel end headers joined to the side headers with the connections between the end headers and side headers forming angles of approximately 90°. The side headers and end headers may, thereby, form a closed loop for the supply of gaseous chlorine to the diffuser elements with the diffuser elements being connected in parallel across the side headers and chlorine gas being admitted to the closed loop through a fitting connected to one of the end headers. In this manner, the diffuser elements may each receive chlorine gas from either end and each of the elements receives chlorine gas at approximately the same pressure. Thus, the quantity of chlorine gas discharged to the swimming pool water through each diffuser element is approximately the same as the amount discharged to the pool through each of the other diffuser elements.

More preferably, the diffuser elements have a porosity of about 60 to about 80 percent with the elements being preferably formed from polytetrafluoroethylene. The manifold is preferably formed of polyvinyl chloride piping which is also inert to gaseous chlorine.

DESCRIPTION OF THE DRAWINGS

In illustrating an embodiment of the invention, reference is made to the accompanying drawings in which.

DETAILED DESCRIPTION

Figure 1:
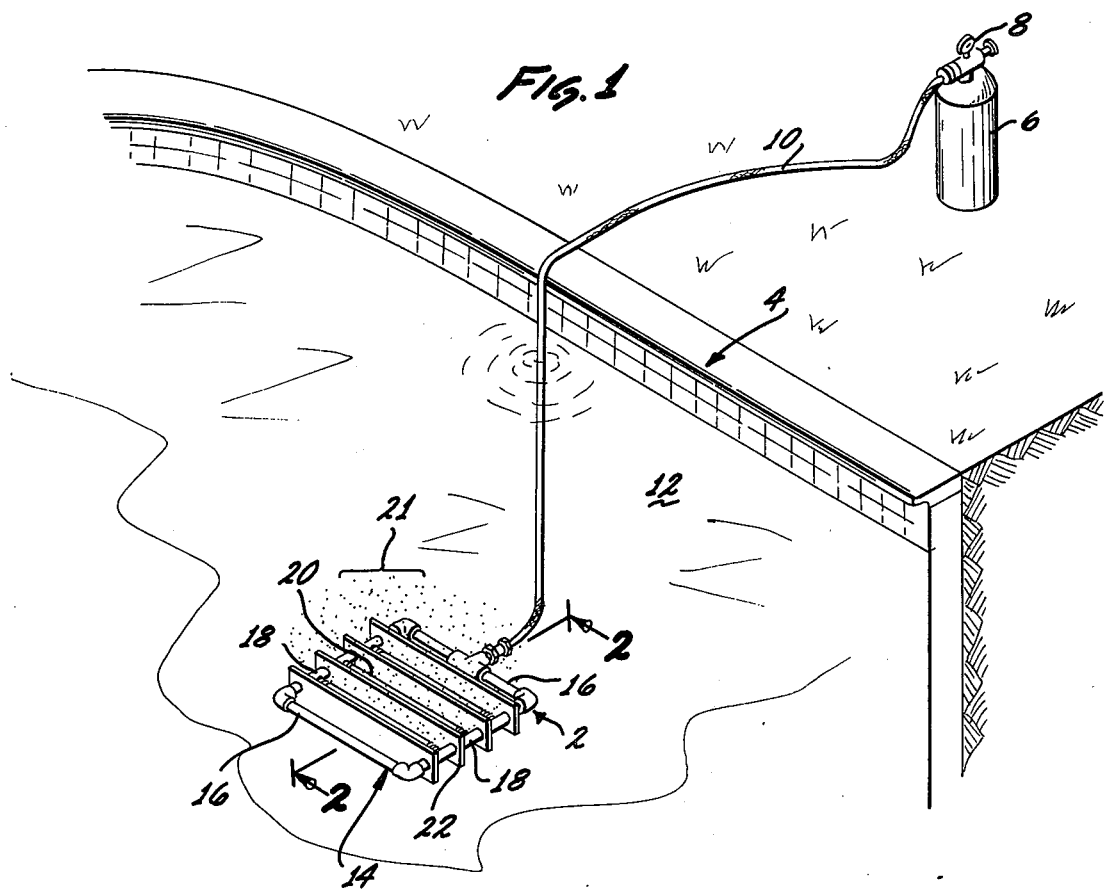
FIG. 1 is a perspective view of a chlorine diffuser immersed in the water of a swimming pool and resting on the swimming pool bottom while receiving chlorine gas from a pressurized container.

As shown in FIG. 1, a chlorine diffuser, generally indicated as 2, is positioned within a swimming pool generally indicated as 4 and receives gaseous chlorine from a pressurized container 6 through a reducing valve 8 and a conduit 10 connected to the diffuser. Optionally, a heat exchanger (not shown) may be positioned adjacent the pressurized container 6 to assist in gasifying the chlorine supplied to the diffuser 2. During expansion of liquid chlorine and its conversion to a gas, the chlorine will undergo a drop in temperature which may, for example, cause the reducing valve 8 to freeze up depending upon the rate at which the chlorine is being gasified. The use of an optional heat exhchanger, thus, may supply heat to the reducing valve 8 to maintain it in an operating condition during rapid gasification of liquid chlorine for supply to the diffuser 2.

The diffuser 2 is mounted within the swimming pool water indicated as 12 and includes a manifold generally indicated as 14 which may include a pair of substantially parallel end headers 16 joined to a substantially parallel pair of side headers 18 with the end headers and side headers forming a closed loop for supply of gaseous chlorine to a plurality of porous plastic diffuser elements 20. As illustrated, the diffuser elements 20 may be mounted in parallel between the side headers 18 such that the diffuser elements receive gaseous chlorine from either of their ends.

It is advantageous that the elements 20 receive gaseous chlorine from either of their ends since this provides a more even feed of chlorine gas through the diffuser elements along their entire length. If, for example, the diffuser elements 20 received chlorine gas from only one of their ends, there would be a pressure drop within the diffuser elements from the point of introduction of the chlorine gas to the opposite closed ends of the diffuser elements. This would cause uneven flow of chlorine through the diffuser elements 20 into the swimming pool water 12 with the flow rate being highest adjacent the point of introduction of chlorine and then dropping off gradually along the length of the element toward its opposite end.

By virtue of the very fine pore openings through the diffuser elements 20, the gaseous chlorine introduced into the swimming pool water 12 appears as minute bubbles illustrated as 21. The very small size of the bubbles 21, which may, for example, be about 1/64th of an inch or smaller, provides a very rapid uptake of the gaseous chlorine by the swimming pool water. This permits the chlorination of the swimming pool water 12 in a shorter time than has been previously obtainable in the chlorination of swimming pool water with chlorine gas. Thus, the use of the present diffuser provides a more efficient means of chlorinating swimming pool water with substantial savings in the time required for chlorination.

Separators 22 may be positioned between the porous diffuser elements 20 such that each element functions substantially independently and is not affected by the functioning of an adjacent diffuser element. The separators 22, as shown, may extend down below the plane of the manifold 14 to provide support for the manifold in positioning the diffuser 2 in contact with the bottom surface of a swimming pool 4.

Figure 2:
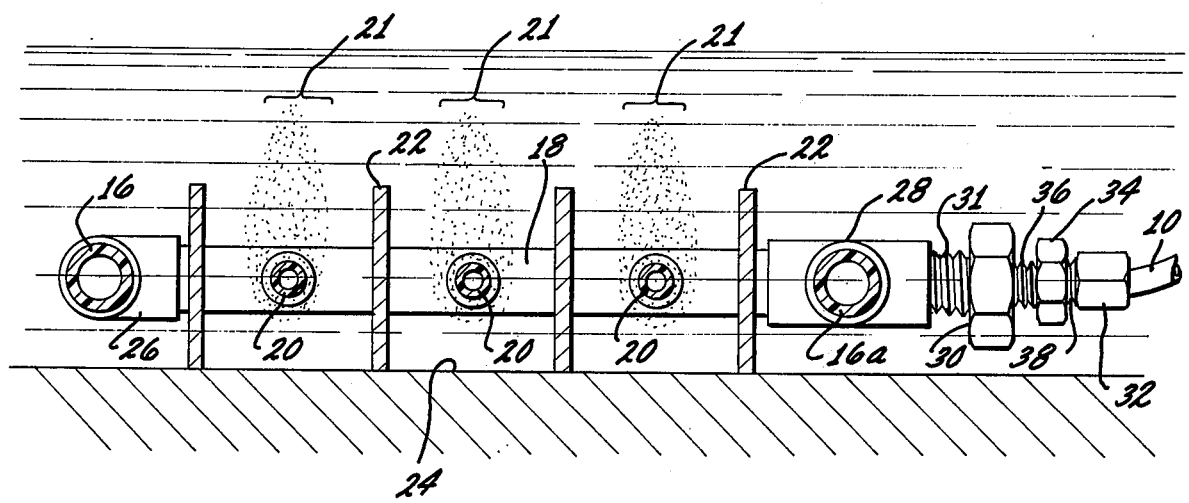
FIG. 2 is a side sectional view taken along the line 2—2 of FIG. 1 and illustrating certain of the structural details of the chlorine diffuser and the relationship of the diffuser with respect to the swimming pool bottom on which it is supported.

FIG. 2, which is a side view in partial section taken along the line 2—2 of FIG. 1, illustrates the positioning of the chlorine diffuser 2 with respect to a swimming pool bottom 24. As shown, the separators 22 are engaged at their lower edges with the swimming pool bottom 24 to support the manifold 14 in a spaced relation with respect to the swimming pool bottom. The end headers 16 may be connected to the side headers 18 through elbows 26 and one of the end headers 16 may be divided into two sections 16a, each of which is connected to an elbow 26 at its outer end with its inner end being joined to a tee 28.

The tee 28 may be connected in any suitable manner to the supply conduit 10 for the gaseous chlorine. One suitable arrangement, as shown in FIG. 2, includes a bushing 30 having a threaded stub end 31 which is threadedly engaged with internal threads of the tee 28. An internally threaded rotatable coupling 32 mounted in any suitable manner on the conduit 10 may be secured to the bushing 30 through a coupling 34 having a threaded portion 38 which engages the rotatable coupling and a threaded portion 36 which engages internal threads within the bushing 30.

Figure 3:
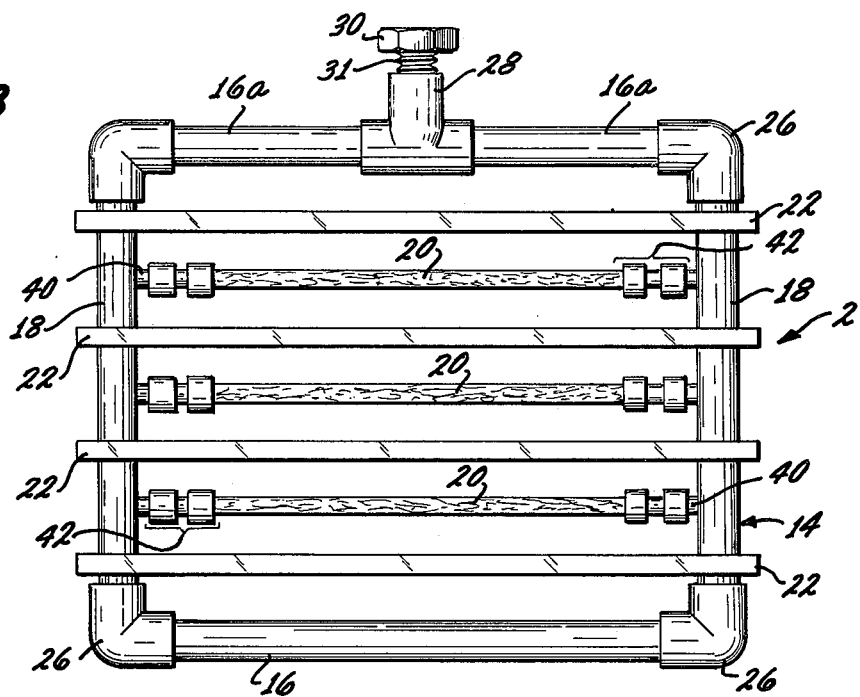
FIG. 3 is a plan view of the chlorine diffuser illustrating the configuration of the manifold which includes a pair of substantially parallel side headers and a pair of substantially parallel end headers joined to the side headers with the connections between the end headers and side headers forming angles of approximately 90° and with the diffuser elements connected in parallel across the side headers.

Turning to FIG. 3, which illustrates the gaseous diffuser 2 in plan view, the manifold 14 may take the form of a closed loop with the porous diffuser elements 20 connected in parallel across the side headers 18 of the manifold. The separators 22 are positioned on either side of the diffuser elements 20 so as to isolate each element from its adjoining element and also to provide support for positioning the manifold 14 with respect to the bottom surface of a swimming pool. The separators 22 may be secured to the side headers 18 in any suitable manner. Thus, for example, the headers 22 may include holes which receive the side headers 18 with the separators 22 then being glued to the side headers. Conveniently, the manifold 14 may be formed of a plastic material which is inert to chlorine such as polyvinyl chloride.

In securing the porous diffuser elements 20 to the side headers 18, externally threaded stub fittings 40 may be positioned along the side headers. The fittings 40 may be joined in any suitable manner to the side headers 18, such as the use of plastic glue or by being threaded into openings in the side headers. Compression fittings 42 positioned at either end of the porous diffuser elements 20 may be used to connect the diffuser elements to the stub fittings 42 so that the diffuser elements are connected across the two side headers 18.

Figure 4:
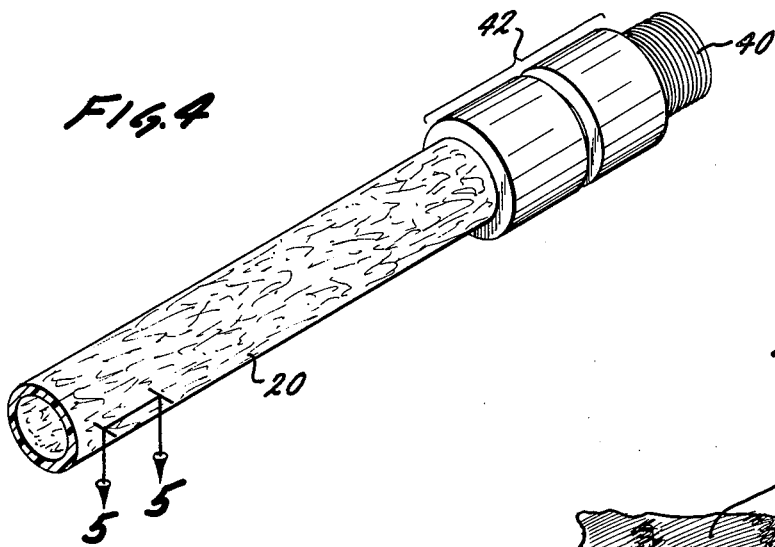
FIG. 4 is a detailed prespective view of a diffuser element with a compression fitting and a portion of a threaded stub fitting connected to a side header of the manifold to illustrate the manner in which the porous diffuser element may be connected at one of its ends to a side header of the manifold.

The manner in which a diffuser element 20 may be secured at one of its ends to a side header 18 is illustrated in FIG. 4 which is an enlarged pictorial representation of the diffuser element 20 having a compression fitting 42 at one of its ends adjacent a threaded fitting 40. The threaded fitting 40 may include a conical nose portion (not shown) which engages one of the ends of the porous diffuser element. Internal threads on the compression fitting 42 are then threadedly engaged with the external threads on the fitting 40. This produces a tight fit of the diffuser element about the conical nose of the fitting 40. Compression fittings are well known and are available commercial items. Thus, the general description of a compression fitting which may be utilized in the present structure is merely by way of background and it should be understood that any suitable type of fitting may be used in securing the porous diffuser elements 20 to the side headers 18.

Figure 5:
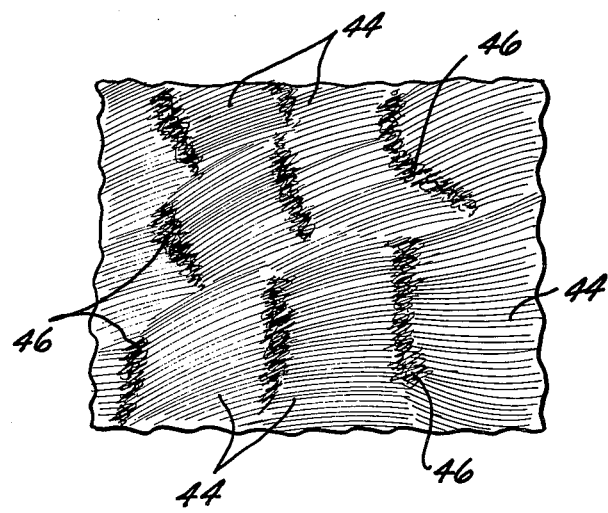
FIG. 5 is a detailed greatly enlarged view illustrating the internal structure of the diffuser element as viewed along the line 5—5 of FIG. 4 to demonstrate the porous nature of the element.

FIG. 5 illustrates a greatly enlarged representation of the internal structure of the diffuser elements 20 as viewed along the line 5—5 of FIG. 4. As shown, the porous plastic material is composed of fibers 44 having pores 46 throughout the structure of the plastic. The porous nature of the plastic material utilized in forming the elements 20 is of great importance to the present invention since the very small pore openings in the plastic material permits the formation of very minute bubbles of chlorine gas illustrated as 21 within the swimming pool water 12 (see FIG. 1). The plastic materila utilized in the diffuser elements 20 is inert to chlorine and has a porosity of about 5 to about 95 percent. The porosity is determined by dividing the pore volume of the material by the sum of the pore volume and the matrix volume and then multiplying the fraction by 100. The outer surface of the diffuser elements is water wettable. However, the outer surface is not penetrated by water when the differential internal chlorine pressure is about 5 pounds per square inch. Thus, chlorine gas diffuses outwardly through the elements 20 while the ingress of water through the elements is prevented.

The plastic diffuser elements 20 contain microscopic pores whose size may range up to about 6 microns and the porous elements have a resiliency or stretchability which provides, at least in part, self cleaning of the elements. In usage, the pores within the elements 20 may become partially blocked by contaminant materials that may be found in liquid chlorine, such as finely divided particles of iron oxide. On partial clogging of the pores, the internal pressure within the diffuser elements 20 will increase somewhat which will cause the elements to stretch. This, in turn, causes the pores to enlarge slightly so as to pass the contaminant materials. Following this, the pores may return to their normal size for continued usage of the diffuser elements.

Preferably, the diffuser elements 20 are constructed of porous polytetrafluoroethylene. This material is commercially available under the trademark GORE-TEX from W. L. Gore & Associates, Inc.

The diffuser elements 20, as illustrated, conveniently have a tubular configuration and preferably have an inside diameter of about ¼ to about ⅜ of an inch. The diffuser elements 20 preferably have a length of about 4 to about 6 inches since this provides relatively uniform pressurization of the elements throughout their entire lengths when the elements are fed from both of their ends. More preferably, the porous diffuser elements 20 have a porosity of about 60 to about 80 percent. Such elements have been used and found to perform admirably in the direct chlorination of swimming pool water by gaseous chlorine.

I claim:

1. A chlorine diffuser for direct chlorination of swimming pool water with gaseous chlorine comprising:
   a manifold;
   a plurality of porous plastic diffuser elements connected to said manifold for pressurization of the diffuser elements with gaseous chlorine from each of their ends in discharging chlorine through the porous elements into swimming pool water;
   said diffuser elements having an outer surface which is water wettable but is not penetrated by water at a differential chlorine pressure of about 5 pounds per square inch;
   said diffuser elements having microscopic pores which are sufficiently large to permit the passage of chlorine gas through said pores at a differential internal chlorine pressure of about 5 pounds per square inch and said pores ranging in sizes up to about 6 microns, and
   said diffuser elements having a stretchability to provide self-cleaning in periodically cleansing the pores of the diffuser elements of contaminants found in liquid chlorine.

2. The chlorine diffuser of claim 1 wherein said diffuser elements are constructed of porous polytetrafluoroethylene.

3. The chlorine diffuser of claim 2 wherein said elements have an inside diameter of about ¼ to about ⅜ths of an inch.

4. The chlorine diffuser of claim 3 wherein the diffuser elements each have a length of about 4 to about 16 inches.

5. The chlorine diffuser of claim 1 wherein
   said manifold includes a pair of substantially parallel side headers; a pair of substantially parallel end headers joined to the side headers with the connections between the end headers and side headers forming angles of approximately 90°, with the side headers and end headers forming a loop for the supply of gaseous chlorine to the diffuser elements, and
   the diffuser elements being connected in parallel across the side headers, whereby the diffuser elements are each pressurizable from either end from the manifold.

6. The chlorine diffuser of claim 5 wherein
said diffuser elements are constructed of polytetrafluoroethylene, and
said elements have a porosity of about 60 to about 80 percent.

7. The chlorine diffuser of claim 5 wherein said diffuser elements each have a length of about 4 to about 16 inches.

8. The chlorine diffuser of claim 7 wherein
said diffuser elements are constructed of polytetrafluoroethylene, and
said elements have a porosity of about 60 to about 80 percent.

9. The chlorine diffuser of claim 8 wherein the side headers and end headers are formed of polyvinyl chloride piping.

10. The chlorine diffuser of claim 1 wherein said diffuser elements have a porosity of about 5 to about 95 percent.

11. A chlorine diffuser for direct chlorination of swimming pool water with gaseous chlorine comprising:
a manifold;
a plurality of porous plastic diffuser elements connected to the manifold for pressurization of the diffuser elements with gaseous chlorine from each of their ends in discharging chlorine through the porous elements into swimming pool water;
said diffuser elements being formed of a plastic material which is inert to chlorine;
said diffuser elements having an outer surface which is water wettable but is not penetrated by water at a differential internal chlorine pressure of about 5 pounds per square inch;
said diffuser elements having pores which are sufficiently large to premit the passage of chlorine gas through said pores at a differential internal chlorine pressure of about 5 pounds per square inch and said pores ranging in size up to about 6 microns;
said diffuser elements having a stretchability to provide self-cleaning in periodically cleansing the pores of the diffuser elements of contaminants found in liquid chlorine, and
a plurality of separators positioned between said diffuser elements to isolate each diffuser element from adjacent diffuser elements.

12. The chlorine diffuser of claim 11 wherein the separators are shaped to provide support for the manifold in positioning the manifold in spaced relation to the bottom of a swimming pool.

13. A chlorine diffuser for direct chlorination of swimming pool water with gaseous chlorine comprising:
a manifold;
a plurality of porous plastic diffuser elements connected to the manifold for pressurization of the diffuser elements with gaseous chlorine from each of their ends in discharging chlorine through the porous elements into swimming pool water;
said manifold including a pair of substantially parallel side headers and a pair of substantially parallel end headers joined to the side headers with the connections between the end headers and side headers forming angles of approximately 90° and with the side headers and end headers forming a loop for the supply of gaseous chlorine to the diffuser elements;
said diffuser elements being connected in parallel across said side headers;
said diffuser elements being formed of a plastic material which is inert to chlorine;
said diffuser elements having an outer surface which is water wettable but is not penetrated by water at a differential internal chlorine pressure of about 5 pounds per square inch;
said diffuser elements having microscopic pores which are sufficiently large to permit the passage of chlorine gas through said pores at a differential internal chlorine pressure of about 5 pounds per square inch and said pores ranging in size up to about 6 microns;
said diffuser elements having a stretchability to provide self-cleaning in periodically cleansing the pores of the diffuser elements of contaminants found in liquid chlorine;
a plurality of separators positioned between said diffuser elements to isolate each diffuser element from adjacent diffuser elements, and
said separators being joined to said side headers.

14. The chlorine diffuser of claim 13 wherein the separators are shaped to provide support for the manifold in positioning the manifold in spaced relation to the bottom of a swimming pool.

* * * * *